United States Patent
Frigo

(10) Patent No.: US 9,600,914 B2
(45) Date of Patent: Mar. 21, 2017

(54) LAYERED TWO-DIMENSIONAL PROJECTION GENERATION AND DISPLAY

(71) Applicant: KONINKLIJKE PHILIPS N.V., Eindhoven (NL)

(72) Inventor: Sean Frigo, Marshall, WI (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/782,362

(22) PCT Filed: Apr. 4, 2014

(86) PCT No.: PCT/IB2014/060418
§ 371 (c)(1),
(2) Date: Oct. 5, 2015

(87) PCT Pub. No.: WO2014/167466
PCT Pub. Date: Oct. 16, 2014

(65) Prior Publication Data
US 2016/0048984 A1    Feb. 18, 2016

Related U.S. Application Data

(60) Provisional application No. 61/809,981, filed on Apr. 9, 2013.

(51) Int. Cl.
*G06K 9/00* (2006.01)
*G06T 11/00* (2006.01)
*G06T 15/08* (2011.01)

(52) U.S. Cl.
CPC .......... *G06T 11/008* (2013.01); *G06T 15/08* (2013.01); *G06T 2207/10028* (2013.01);
(Continued)

(58) Field of Classification Search
None
See application file for complete search history.

(56) References Cited

U.S. PATENT DOCUMENTS 5,566,279 A    10/1996 Katayama
5,986,662 A    11/1999 Argiro et al.
(Continued)

OTHER PUBLICATIONS

Bijhold, J.; Three-dimensional verification of patient placement during radiotherapy using portal images; 1993; Med. Phys.; 20(2)347-356.
Bushberg, J. T., et al.; Section I: Basic Concepts: 1.1 The Modalities; 2002; "The Essential Physics of Medical Imaging"; Lippincott; 2nd Ed. pp. 4-5.
(Continued)

*Primary Examiner* — Weiwen Yang

(57) ABSTRACT

An imaging system (10) generates a layered reconstructed radiograph (LRR) (66) of a subject. The system (10) takes as input a three-dimensional (3D) or higher dimensional data set (68) of the object, e.g. data produced by an image scanner (12). At least one processor (32) is programmed to define a set of two-dimensional (2D) projection images and associated view windows (60, 62, 64) corresponding to a set of voxel value (tissue) types with corresponding voxel value specification (50); determine the contribution of each processed voxel along each of a plurality of rays (72) through the 3D data set (68) to one of the predetermined voxel value (tissue) types in accordance with each voxel value with respect to the voxel value selection specification (50); and concurrently generate a 2D projection image corresponding to each of the voxel value specifications and related image view windows (60, 62, 64) based on the processed voxel values satisfying the corresponding voxel value specification (50). Each image is colorized differently and corresponding pixels in the images are aligned. An LRR (66) is generated by layering the aligned, colorized images and displaying as a multi-channel color image, e.g. an RGB image.

22 Claims, 9 Drawing Sheets

(52) U.S. Cl.
CPC .............. *G06T 2207/10072* (2013.01); *G06T 2207/10124* (2013.01); *G06T 2207/30004* (2013.01)

(56) References Cited

U.S. PATENT DOCUMENTS

| | | | |
|---|---|---|---|
| 7,924,279 B2 | 4/2011 | Gerritsen et al. | |
| 8,358,304 B2 | 1/2013 | Brabec | |
| 2004/0125103 A1* | 7/2004 | Kaufman | G06T 15/06 345/419 |
| 2005/0135664 A1* | 6/2005 | Kaufhold | G06T 11/006 382/131 |
| 2006/0143215 A1* | 6/2006 | Truyen | G06T 11/008 |
| 2013/0004043 A1* | 1/2013 | Ross | G06T 7/0016 382/131 |

OTHER PUBLICATIONS

Giljuijs, K. G. A., et al.; Automatic three-dimensional inspection of patient setup in radiation therapy using portal images, simulator images, and computed tomography data; 1996; Med. Phys.; 23(3)389-399.
Hendee, W. R., et al.; Computer Based Treatment Planning; "Radiation Therapy Physics"; 2005; 3rd Ed.; Wiley-Liss; pp. 249-253.
Philips AcQSim3 Instruction Manual; 2010; Release 9.2.
Sato, Y., et al.; Tissue Classification Based on 3D Local Intensity Structures for Volume Rendering; 2000; IEEE Trans. on Visualization and Computer Graphics; 6(2)160-180.
Reutek, P., et al.; Semantic Layers for Illustrative Volume Rendering; 2007; IEEE Trans. on Visualization and Computer Graphics; 13(6)1336-1343.

* cited by examiner

LAYERED TWO-DIMENSIONAL PROJECTION GENERATION AND DISPLAY

CROSS REFERENCE TO RELATED APPLICATIONS

This application is a national filing of PCT application Serial No. PCT/IB2014/060418, filed Apr. 4, 2014, published as WO 2014/167466 A1 on Oct. 16, 2014, which claims the benefit of U.S. provisional application Ser. No. 61/809,981 filed Apr. 9, 2013, which is incorporated herein by reference.

The present application relates generally to diagnostic imaging. It finds particular application in conjunction with rapid visualization of spatial relationships in medical image data sets generated by computed tomography (CT) systems, magnetic resonance (MR) imaging systems, positron emission tomography (PET) systems, single photon emission computed tomography (SPECT), and will be described with particular reference thereto. However, it is to be understood that it also finds application in other usage scenarios and is not necessarily limited to the aforementioned application.

A planar radiographic image is the projection of a transmitted radiation source through a three-dimensional object. The projection is created by connecting lines (rays) from the radiation source to points on a plane on the opposite side of the object. Each point in the planar image is the sum of contributions from small volume elements of the object interacting with the ray. These volument elements are represented by discrete volument elements called voxels, which generally represent values within the discrete element on a regular grid in three-dimensional space. For example, in a CT scan, voxels may represent values of radiodensity (absorption) of tissue, measured in Hounsfield units (a quantitative scale relative to water for describing radiodensity), which correlate with radiation attenuation and tissue density. A simple example is a measured projection image of an object of interest where each pixel is the sum of absorption of all the small segments along a line from the source to the point in the plane. When the object is represented by a measured three-dimensional data set, such as a CT scan, a projection image may be computed using a technique termed ray-casting to produce a digitally reconstructed radiograph (DRR).

DRR images, however, can suffer from poor spatial and contrast resolution, resulting from a number of factors. Examples include low spatial sampling in the CT image data set, the fact that each pixel in the DRR image is an integral sum, the presence of significant noise in the CT image data set, and the like. Previous attempts to alleviate these issues include digitally composited radiographs (DCRs), which are generated by application of voxel processing functions and also by using a selected subset of the voxels in the CT image data set for calculation. A projection image generated in such a manner using DCR provides a clearer view of desired tissues (bony anatomy such as vertebrae and airway) than in a DRR, at the expense of neglecting some regions of the 3D data set.

In both cases, DRR and DCR images consist of a single image array whose display is limited to standard window/level adjustment. Because each pixel in these images contain contributions from all tissue types mixed together into a single number, neither previous method allows for the visualization of two or more types of tissue simultaneously. As a result of folding voxel values into a sum, the resulting spatial resolution in the calculated image data is lower than if the values could be separated or grouped for separate calculations. To address these challenges, multiple renderings may be performed such that each one can be tissue-specific, by creating separate DRRs or DCRs for each. The resulting DRR or DCR images, however, are displayed separately, e.g., tiled in pairs in separate view windows.

The present application provides new and improved methods and systems which overcome the above-referenced challenges.

In accordance with one aspect, a system generates layered two-dimensional projections from a three-dimensional data set of a subject. At least one processor is programmed to define a plurality of projection images, each image corresponding to one of a set of predetermined voxel types, with each voxel type including a voxel value selection of one or more ranges in value. The at least one processor is further programmed to classify each voxel lying along each of a plurality of rays through the data set as belonging to or not to one of the predetermined voxel types in accordance with voxel value with respect to specified voxel value ranges. The at least one processor is further programmed to concurrently generate two-dimensional projection images populated by processed voxels belonging to each image's voxel value selection specification, and shown in view windows.

In accordance with another aspect, a method generates layered two-dimensional image projections. The method includes defining a plurality of two-dimensional projection image data corresponding to a set of predetermined voxel types determined by an associated voxel value selection. In addition, the method includes classifying each of a plurality of voxels lying along a plurality of rays cast through a three-dimensional data set as corresponding to one of the set of predetermined voxel types in accordance with a value of the voxel being within the associated voxel value selection. The method also includes selectively adding a processed value of each voxel to a sum and assigning that sum to a corresponding pixel value of one of the two-dimensional projection images corresponding to the classified voxel type. Additionally, the method includes concurrently generating the plurality of two-dimensional projection images in accordance with the selectively added processed values of each voxel to the corresponding pixel value of each two-dimensional projection image.

In accordance with another aspect, a system is provided. The system includes a display device having a plurality of display pixels. The system further includes at least one processor is programmed to cast a ray corresponding to each display pixel through a three-dimensional (3D) image data set of a subject intersecting a plurality of voxels of the 3D image data set. The processor is further configured to classify each of the voxels of the 3D data set intersected by each ray as being of zero or more voxel types, each voxel type corresponding to one of a plurality of voxel value specifications, the classifying including comparing each voxel value with the predetermined voxel value ranges. The processor is further programmed to combine the processed voxel values along each ray that fall in the same value specification to generate pixel values of two-dimensional (2D) projection images, each 2D projection image corresponding to one of the value specifications such that each of the 2D projection images corresponds to one of the voxel value types.

One advantage resides in the ability to quickly assist in the targeting of soft tissue in radiotherapy through the registration with measured kV or MV radiographs taken in the treatment room.

Another advantage resides in generation of two-dimensional images of different tissue types from a single three-dimensional data set.

Another advantage resides in providing greater spatial and contrast resolution than is available using current DRR and DCR calculation and display methods.

Another advantage resides in the ability to segregate different types of tissue densities into specific projection planes and then display later at the same time, with no need for additional or different ray-casting calculations.

Another advantage resides in the ability to visualize properties in other image data sets such as MR, PET/CT, radiation dose, etc., for quick viewing and analysis as two-dimensional images.

Another advantage resides in the ability to connect radiographic and CT imaging of the same object taken at different points in time, e.g. during inspection of manufactured parts.

Still further advantages of the present invention will be appreciated by those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1A:
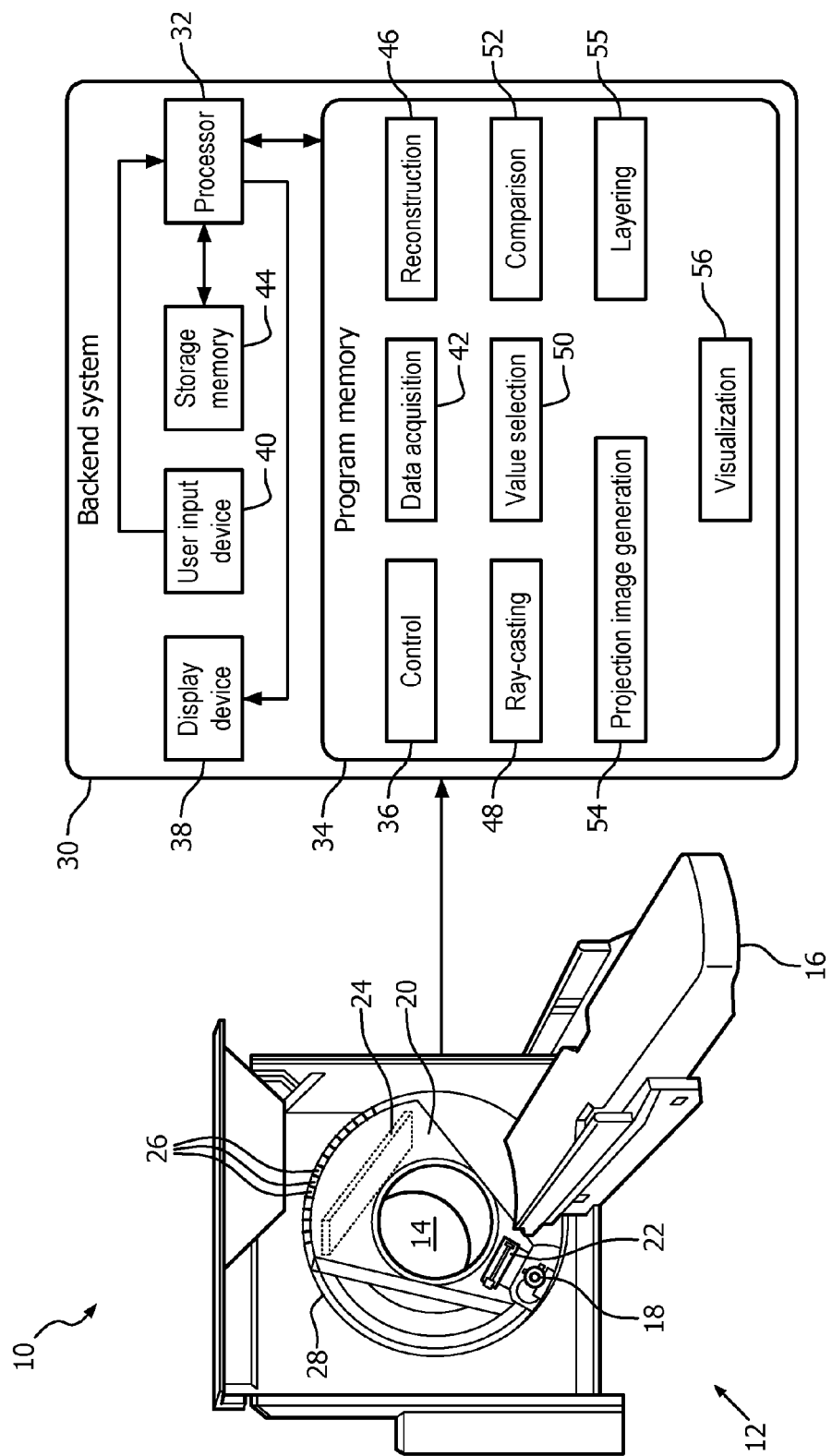
FIG. 1A illustrates a CT system.

With reference to FIG. 1A, a functional block diagram illustrates a system 1

Figure 1B:
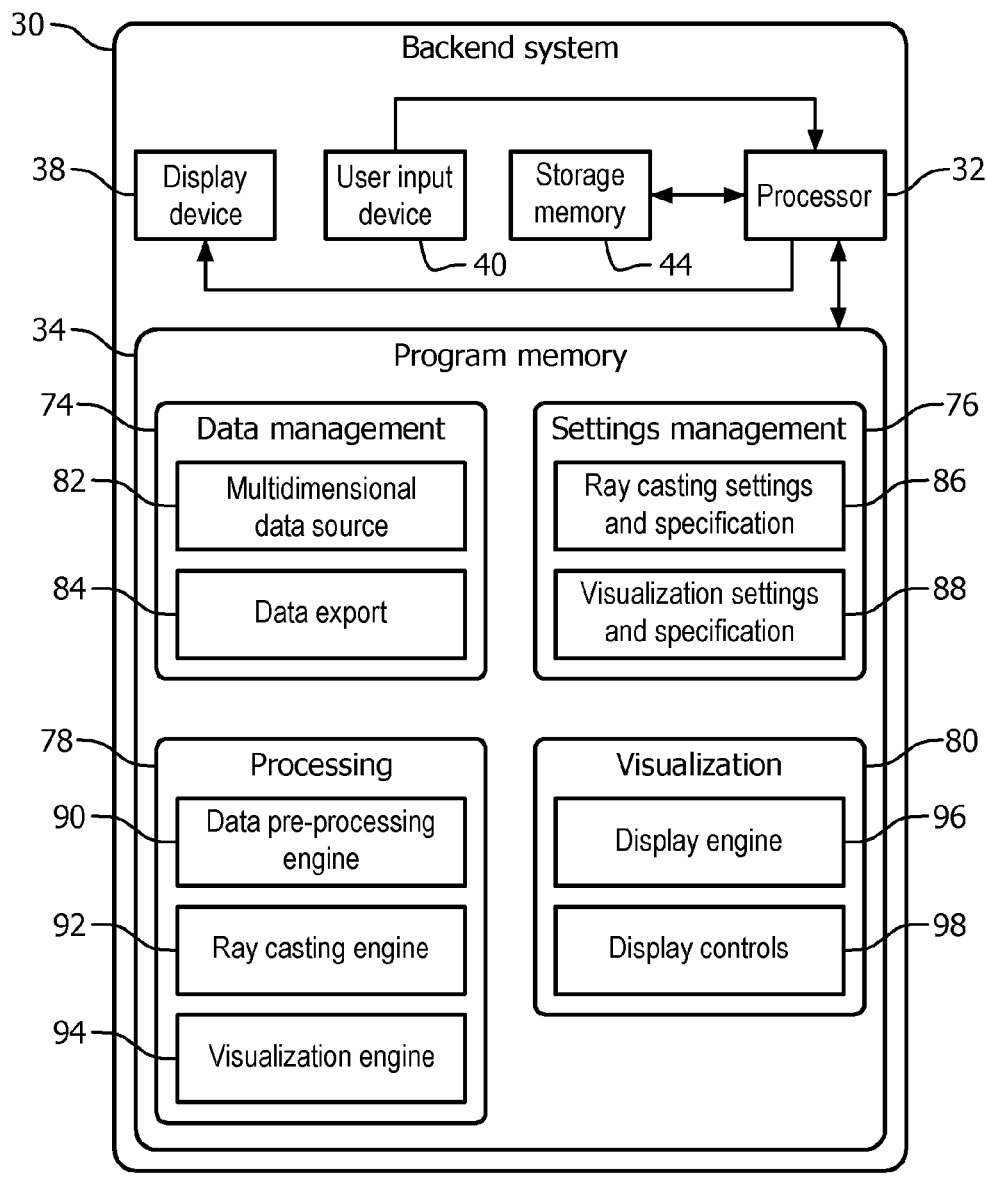
FIG. 1B illustrates a block diagram of a system for generating layered two-dimensional projections.

With reference to FIG. 1B, an imaging system 10 utilizes computed tomography (CT), to perform one or more diagnostic scans of an object, such as a patient. The diagnostic scans may be of an anatomical region of interest of the patient, e.g., a particular region of the patient, particular organ or group of organs, or the like. It will be appreciated that while described below with respect to imaging associated with biological subjects, other non-biological subjects (ground scanning, structural scanning of construction or mechanical devices, etc.) may be analyzed in accordance with the systems and methods set forth below. The imaging system 10 includes a scanner 12 that defines an examination volume 14. The examination volume 14 is suitably sized to accommodate the object or patient, which may be positioned on a patient support 16 in the examination volume 14 during a scan.

The imaging system 10 illustrated in FIG. 1A depicts CT scanning for purposes of example only, and it will be appreciated that other imaging systems, such as MR, PET, and the like, are capable of use in accordance with the embodiments disclosed herein. With respect to FIG. 1A, the CT imaging system 10 includes an x-ray tube assembly 18 that is mounted on a rotating gantry 20 and configured to project one or more beams of radiation through the examination volume 14. The imaging system 10 may also include a collimator 22 that collimates the beams of radiation in a beam thickness dimension. In third generation scanners, an x-ray detector 24 is disposed on the rotating gantry 20 across the examination volume 14 from the x-ray tube assembly 18.

In fourth generation scanners, a ring or array of x-ray detector 26 is mounted on a stationary gantry 28 surrounding the rotating gantry 20. The x-ray detector 24, 26 generates data indicative of the integrated x-ray absorption along a corresponding beam between the x-ray tube assembly 18 and the x-ray detector 24, 26.

Each of the x-ray detectors 24, 26 includes a two-dimensional array of photodetectors connected to, or preferably integrated into, an integrated circuit. The photodetectors directly or indirectly detect radiation (i.e., x-ray photons) from the x-ray tube assembly 18 and, based upon the detected radiation, generate absorption data. Examples of the photodetectors include digital or analog silicon photomultipliers (SiPMs), photodiodes, and other opto-electric transducers.

If the photodetectors cannot directly detect the radiation, the x-ray detector 24, 26 typically includes one or more scintillators optically coupled to the photodetectors between the x-ray tube assembly 18 and the photodetectors. When an x-ray photon deposits energy in the scintillators, the scintillators scintillate and emit visible-light photons toward the photodetectors, which the photodetectors can directly detect. Examples of scintillators include scintillator plates, or individual scintillation or pixelated crystals. It will be appreciated that while the imaging system 10 has been described with respect to CT operations, other imaging modalities are also capable of being utilized in the generation of three- or more dimensional data sets of a subject, e.g., MR scanning, PET scanning, and so forth. Furthermore, it will be appreciated that any suitable multi-dimensional data source may be used in accordance with the systems and methods set forth hereinafter.

A backend system 30 coordinates the operations of the scanner 12, and may be positioned remotely therefrom. The backend system 30 includes at least one processor 32 and at least one program memory 34. The backend system 30 may utilize multiple processors, multiple processor cores, or combinations thereof, wherein each processor or core is configured to perform distinct functions of the system 30, e.g., acquisition, data processing, visualization, etc. The program memory 34 includes processor executable instructions that, when executed by the processor 32, coordinate the operation of the scanner 12, including diagnostic scans, process image data sets generated by the scanner 12, and the like. The processor 32 executes the processor executable instructions stored in the program memory 34.

A control module 36 of the processor executable instructions controls overall operation of the backend system 30. The control module 36 suitably displays a graphical user interface (GUI) to a user of the backend system 30 using a display device 38 of the backend system 30. Use of the display device 38 via the control module 36 may be accomplished utilizing a suitable visualization engine, display engine, display controls, and the like, (depicted in FIG. 1B) operative in accordance visualization and display settings and specifications relating to the display of the various outputs of the components in program memory 34 discussed herein. Further, the control module 36 suitably allows the user to interact with the GUI using a user input device 40 of the backend system 30. For example, the user can interact with the GUI to instruct the backend system 30 to coordinate the diagnostic scans, to select desired examination volumes, to modify images displayed on the display device 38, and the like. The GUI, via the user input device 40, may include various control indicia corresponding to tissue selection, image modification, color intensity or luminosity settings, color selections, transparency or opacity settings, and the like.

A data acquisition module 42 of the processor executable instructions performs scans, including the diagnostic scans, of the examination volume. For each scan, the data acquisition module 42 controls the scanner 12 according to scanner parameters of the scan. While controlling the scanner 12, the data acquisition module 42 acquires the absorption data, as well as data on the angular position of the rotating gantry 20, which is typically stored in at least one storage memory 44 of the backend system 30. In accordance with one embodiment, the data acquisition module 42 may be configured to acquire multi-dimensional image data from any suitable data source, e.g., from previously obtained data, from a scanner other than the scanner 12, and so forth. In addition, the data acquisition module 42 may also be configured to acquire data using multiple energy modes, e.g., dual CT scanning, as well as utilize multi-spectral CT image data, and the like. The data acquisition module 42 may be further configured to export acquired data to storage, e.g., local or remote storage, for future usage and analysis.

A reconstruction module 46 of the processor executable instructions reconstructs the raw image data sets into three-dimensional images and/or maps of the examination volume. Various known reconstruction techniques are contemplated including spiral and multi-slice scanning techniques, convolution and back projection techniques, cone beam reconstruction techniques, and the like. The images and/or maps are typically stored in the storage memory 44 and/or displayed on a display device, such as the display device 38.

A ray-casting module 48 of the processor executable instructions generates planar data via voxel integration along defined rays from a virtual source using one or more voxel processing functions. The rays can be parallel, diverge from a point source, converge from a point source, or the like. The ray-casting module 48 may further include settings and specifications 86 (illustrated in FIG. 1B in the settings management module 76) corresponding to how rays are cast, positioning of a source, positioning of a projection plane, and the like. Such settings may be utilized by an associated ray-casting engine 92 of the module 48 for controlling when and where rays are cast through a multi-dimensional data set 82. For each scan, one or more such functions are selected to transform the three-dimensional voxel data collected by the data acquisition module 42 to control contributions to ray-casting sums. Each function may be used to generate unique projection planes from the same three-dimensional voxel data set. Examples of such functions include, for example, binary mask weighting of voxels of specific values or ranges of values, functions simulating radiation absorption or scattering, and the like. The ray-casting module 48 may use a voxel processing function expressed as a product of a weighting function and a processing function to provide independent control of voxel selection and the transformation of selected voxels into suitable values for use hereinafter in generation of windows (discussed below).

A value selection module 50 of the processor executable instructions stores specified values of voxels corresponding to pre-assigned voxel types, e.g. type of tissue. The value selection reflects a range of densities or other volumetric units that correspond to a particular voxel type specification; a specific example would be typical tissue voxel types such as soft tissue (muscle, fat, cartilage), hard (bone) tissue, or empty space (airways and sinuses). The value selection may also reflect a range of densities or other volumetric units corresponding to a particular organ, tumor, or other physiological object. Examples include but are not limited to a kidney, heart, lung, liver, regions enhanced by contrast agents, or the like. Although described with respect to biological tissues, the value selections may reflect different mass or optical densities or volumetric units corresponding to strata, e.g., geological densities of various rocks, liquids, etc., structural, mechanical, or the like, in accordance with the subject of the three-dimensional image data set 68. The value selections are generally used in accordance with a comparison module 52, which compares the respective values of voxels of a captured data set with the value range to classify or determine to which type of tissue, organ, or the like, each voxel corresponds. The comparison module 52 is stored in the processor executable instructions of the program memory 34 of the backend system 30.

A projection image generation module 54 of the processor executable instructions generates one or more two-dimensional projection image data arrays corresponding to the type of voxel (tissue or organ) selected. The projection generation module 54 is capable of concurrently generating a projection image corresponding to soft tissue, a projection image corresponding to hard tissue (bone), a projection image corresponding to empty space (airways), and a composite image representing each of the aforementioned voxel type (tissue) images as a layered radiograph. The images generated are projection layers representing two-dimensional images of the three-dimensional image data set generated by the scanner 12 or other data source. The projection image generation module 54 of the processor executable instructions further only considers voxels for generating projection images in accordance with the classification of the voxels made by the comparison module 52. That is, the projection image generation module 54 facilitates the ultimate visualization of values of voxels in a view window only if the voxel is classified as belonging to that particular window, masking those other voxels on the ray that are not so classified. Other approaches for determining tissue type are contemplated depending on the imaging modality and optionally other available data, such as based on energy resolution in a multi-energy CT system, based on functional information from a complementary PET image, use of tissue-sensitive pulse sequences in MR, other functional imaging techniques, or so forth.

Figure 4:
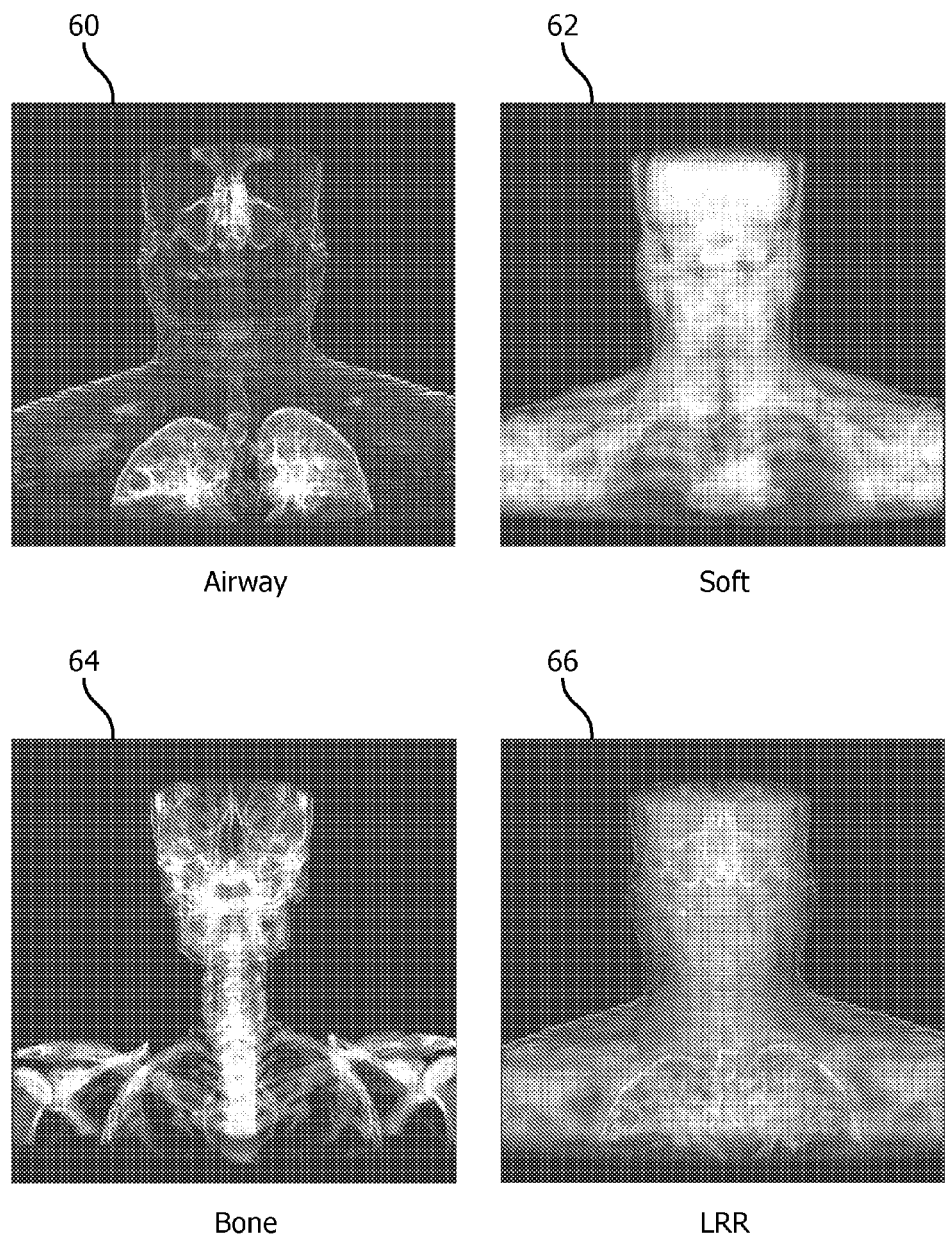
FIG. 4 illustrates two-dimensional projection image windows generated from a three-dimensional data set.

A layering module 55 combines the projection images of the voxel (tissue) specific images and stacks these images into a multi-channel color image to form a layered reconstructed radiograph, i.e., a composite of the images, of the examination volume. FIG. 4 illustrates three distinct tissue projections presented in separate view windows: an airway projection 60, a soft tissue projection 62, and a hard tissue (e.g., bone) projection 64 in accordance with the systems and methods described herein. FIG. 4 further includes a view window 66 depicting a layered reconstructed radiograph (LRR) of the three tissue two-dimensional projection images 60, 62, and 64 using an RGB color space and three color channels. The projections contained in the view windows 62-66 of FIG. 4 may be displayed on the display device 38 and subjected to user-directed adjustments regarding the relative weighting of each projection image contribution to the resulting LRR in accordance with a visualization module 56 via the user input device 40, as discussed in detail below. It will be appreciated that the creation of projections and view windows 60, 62, and 64 for tissue types of a biological subject is an example illustration of the systems and methods set forth herein. Accordingly, the systems and methods may be implemented in non-biological settings, e.g., scanning/imaging of a manufactured article, a building, ground-based radar imaging, etc., which result in three- or more dimensional image data sets. In such implementations, view windows 60, 62, and 64 may correspond to non-biological material e.g., metals of manufactured components, strata of geological formations, materials of a building or structure, and so forth.

FIG. 1B depicts a functional block diagram illustrating voxel selection specification and subsequent processing of multi-dimensional data from any suitable scanning modality. As shown in FIG. 1B, the diagram illustrates an embodiment of the backend system 30 having a data management module 74, a settings management module 76, a processing module 78, and a visualization module 80 stored in program memory 34. It will be appreciated that FIG. 1B depicts a generalized implementation of the subject systems and methods, wherein FIG. 1A depicts an example implementation of the systems and methods described herein. It will further be appreciated that while illustrated as being contained in the program memory 34 of the backend system 30, the various modules 74-80 may be implemented on separate devices in communication with each other, as separate or joint modules stored on the same device, and so forth.

The data management module 74 may include various components, such as a multidimensional data source 82 and a data export 84 component. In some embodiments, the multidimensional data source may represent multidimensional image data received from any suitable image generation device, including, for example CT, MR, PET, and so forth. The data export 84 component may be configured to send pre or post processed data to an external or internal storage device.

The settings management module 76 may include ray-casting settings and specifications 86, corresponding to operations of the ray-casting module 48 illustrated in FIG. 1A and visualization settings and specifications 88 corresponding to operations of the visualization component 56 illustrated in FIG. 1A. Such ray-casting settings and specification 86 may include the voxel selection specification, voxel processing function type, related function specific parameter values, positioning of a projection plane, and so forth, used by the ray-casting module 48. The visualization settings and specifications 88 may include settings related to the view windows 60, 62, 64, and the LRR 66, preset colors and intensities, alpha blending, and the like.

The processing module 78 of FIG. 1B may include various components, such as a data pre-processing engine 90, a ray-casting engine 92, a visualization engine 94, and the like. The data pre-processing engine 90 may be configured to perform preliminary processing on multi-dimensional data, forming received image data into suitable formats for processing, and the like. The ray-casting engine 92 may function in accordance with the ray-casting module 48 and corresponding ray-casting settings and specifications to cast one or more rays through the multidimensional data. The visualization engine 94 may operate in accordance with the visualization settings and specifications 88 to facilitate the generation of view windows 60, 62, 64, and the LRR 66 as discussed herein.

The visualization module 80 (depicted in FIG. 1A at 56) may include a display engine 96 and display controls 98 operative via the display device 38 to form the display of the view windows 60, 62, 64, and LRR 66 thereon. It will further be appreciated that the various modules and sub-modules described above with respect to FIG. 1B may be utilized in addition to or in place of the components depicted in the example implementation of FIG. 1A. Accordingly, the methods described hereinafter may be performed using the various components and modules described in FIGS. 1A-1B.

Figure 2A:
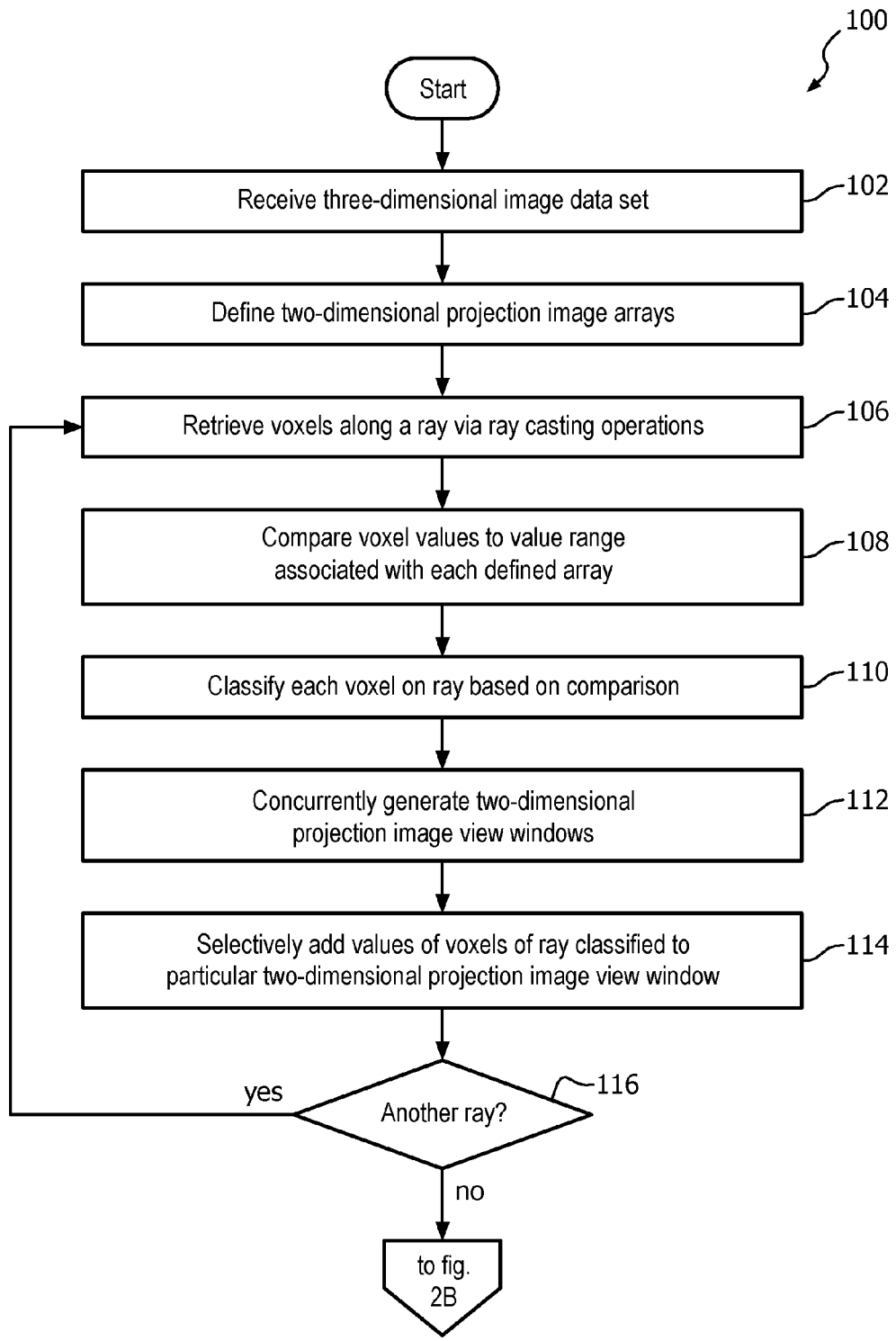
FIG. 2 illustrates a method for generating layered two-dimensional projections.
Figure 2B:
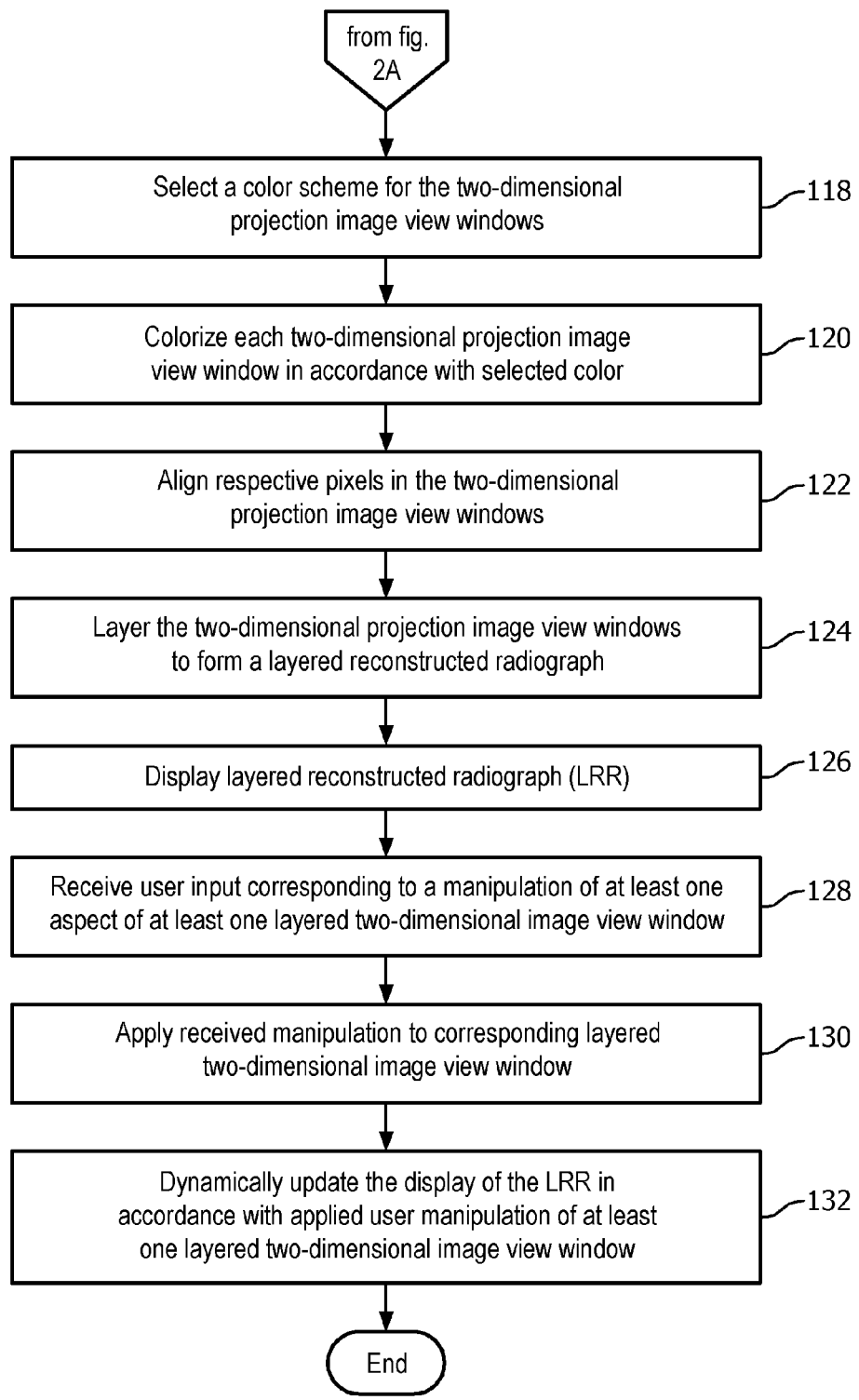
Figure 3A:
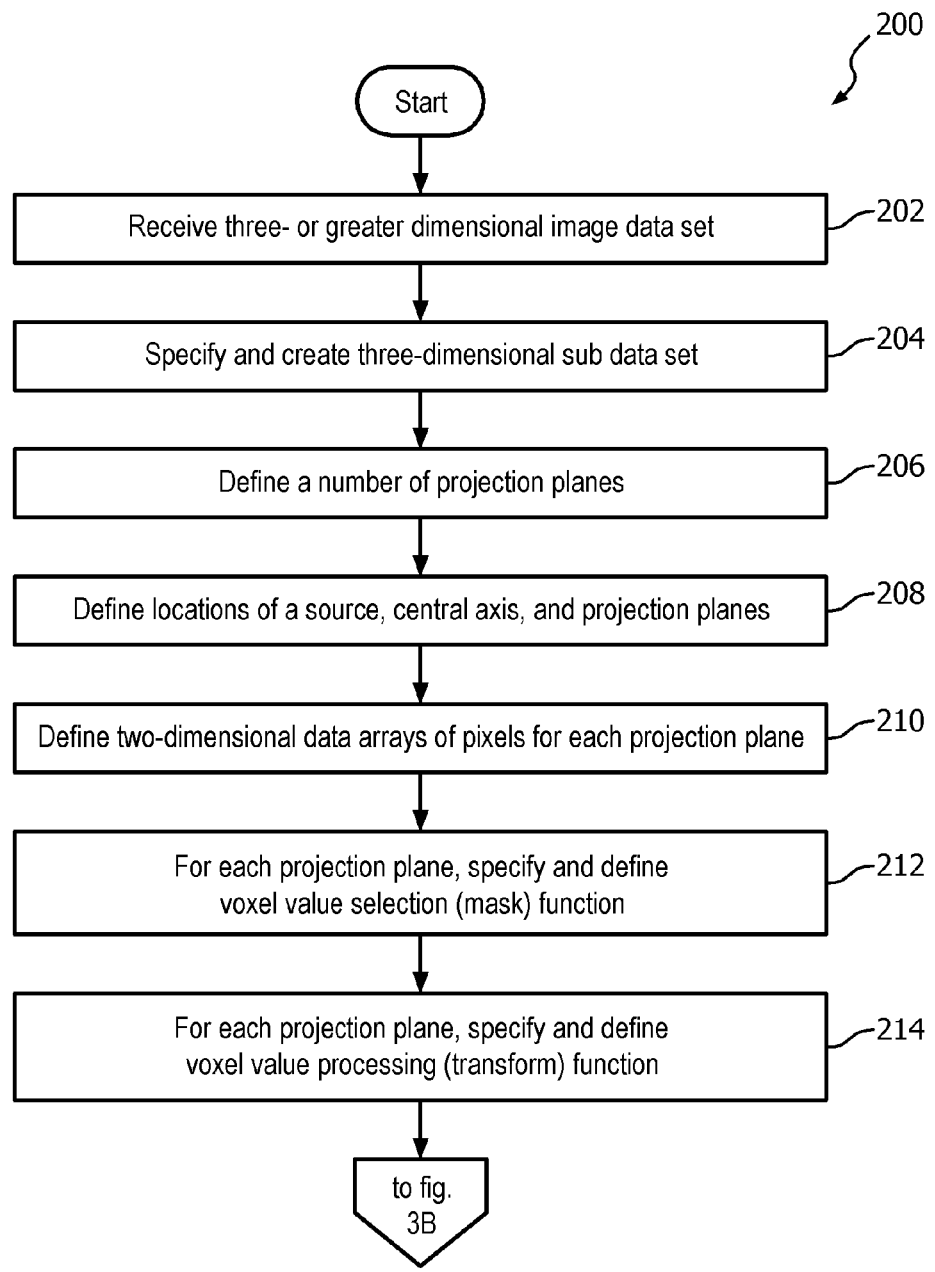
FIGS. 3A-3C illustrate implementations of the method for generating layered two-dimensional projections.

FIG. 2 depicts a method 100 for generating a layered series of two-dimensional projection images. The method 100 includes receiving 102 a three-dimensional image data set 68 from the scanner 12 or other image acquisition source. A set of two-dimensional projection images, e.g., arrays, are then defined 104 corresponding to a set of a selected voxel type of tissue, organ, or the like. A corresponding location of each two-dimensional projection image may also be defined, as discussed below with respect to FIG. 3A. As shown in FIG. 4, a set of three view windows 60, 62, and 64, are created corresponding to a user-specified set of voxel (tissue) types, e.g., airway, soft tissue, and hard tissue, each view window 60, 62, and 64 displaying the corresponding two-dimensional projection image of only one of the defined airway, soft tissue, and the hard tissue voxel types. It will be appreciated that the method described herein is applicable to use in a variety of imaging reconstructions, and DRR and DCR are referenced above as representative examples of such reconstruction techniques. The projection images shown in 60, 62, and 64 correspond to a range of voxel values 50, with each range 50 corresponding to a particular type of tissue, e.g., airway, soft tissue, or hard tissue. The ranges 50 could alternatively correspond to particular types of organs, e.g., kidney, heart, lung, brain, etc., or particular types of tumors. FIG. 3A illustrates an alternate embodiment 200 of creating the data structures utilized in the method for generating layered two-dimensional projections.

Referring now to FIG. 3A, a three-dimensional data set 68 or data set greater than three dimensions is received 202 from any scanning modality, e.g., SPECT, CT, PET, MR, or the like. A three-dimensional data subset is specified and created 204 using the received data set 68. Projection planes are then defined 206 corresponding to a selected number of planes, e.g., the number of planes corresponding to different tissues, different organs, different structures (body, mechanical device, electrical device, geological, or the like). There is no restriction on the number of projection planes that may be specified and calculated.

The location of a source 70, the location of a central axis, and the respective locations of the projection planes are then defined 208. Two-dimensional data arrays of pixels for each projection plane are then defined 210. For each projection plane, a voxel value selection (mask) function is specified and defined 212, as discussed below. Similarly, for each of the projection planes, a voxel value processing (transform) function is specified and defined 214, as discussed below.

Figure 3B:
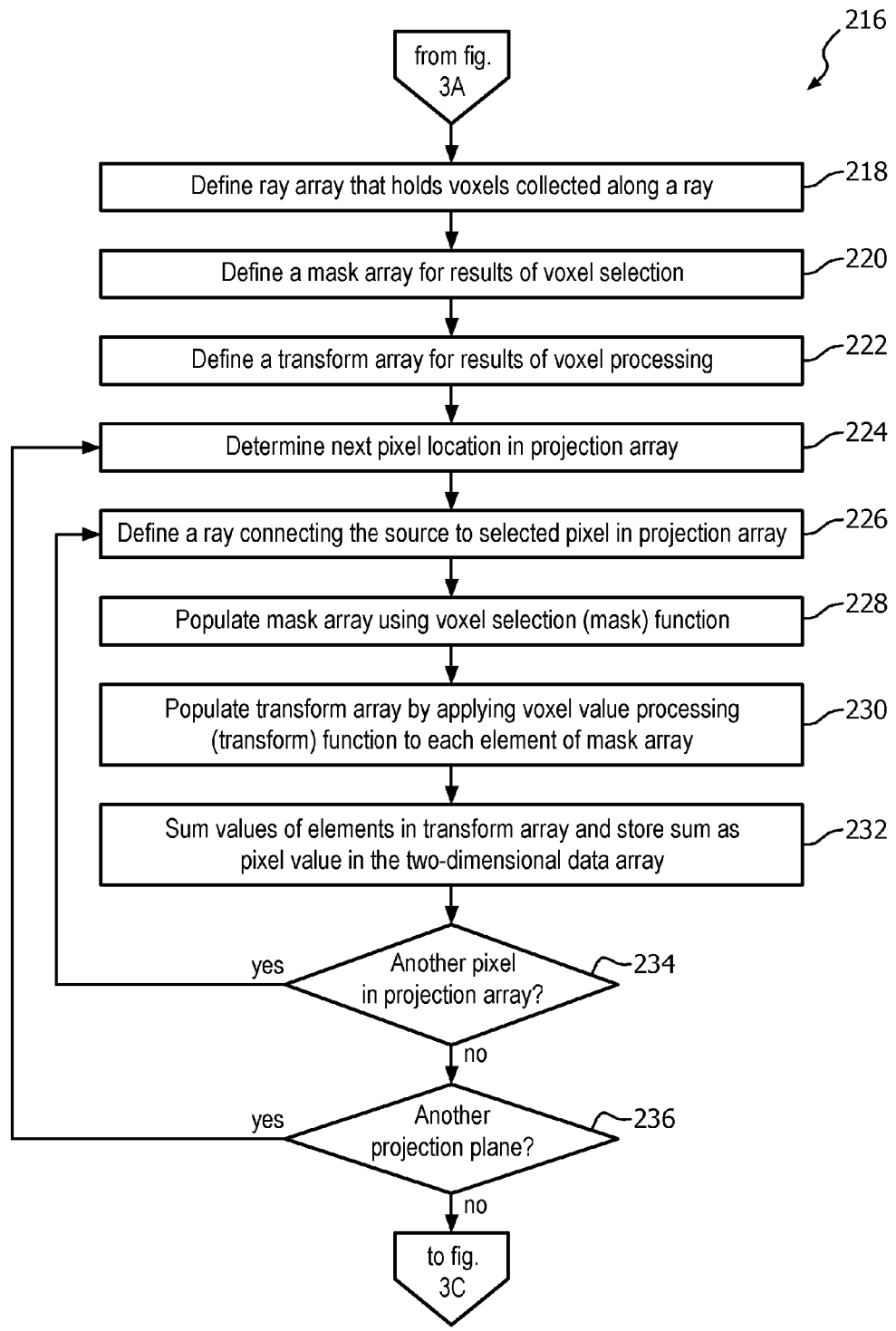
Figure 5:
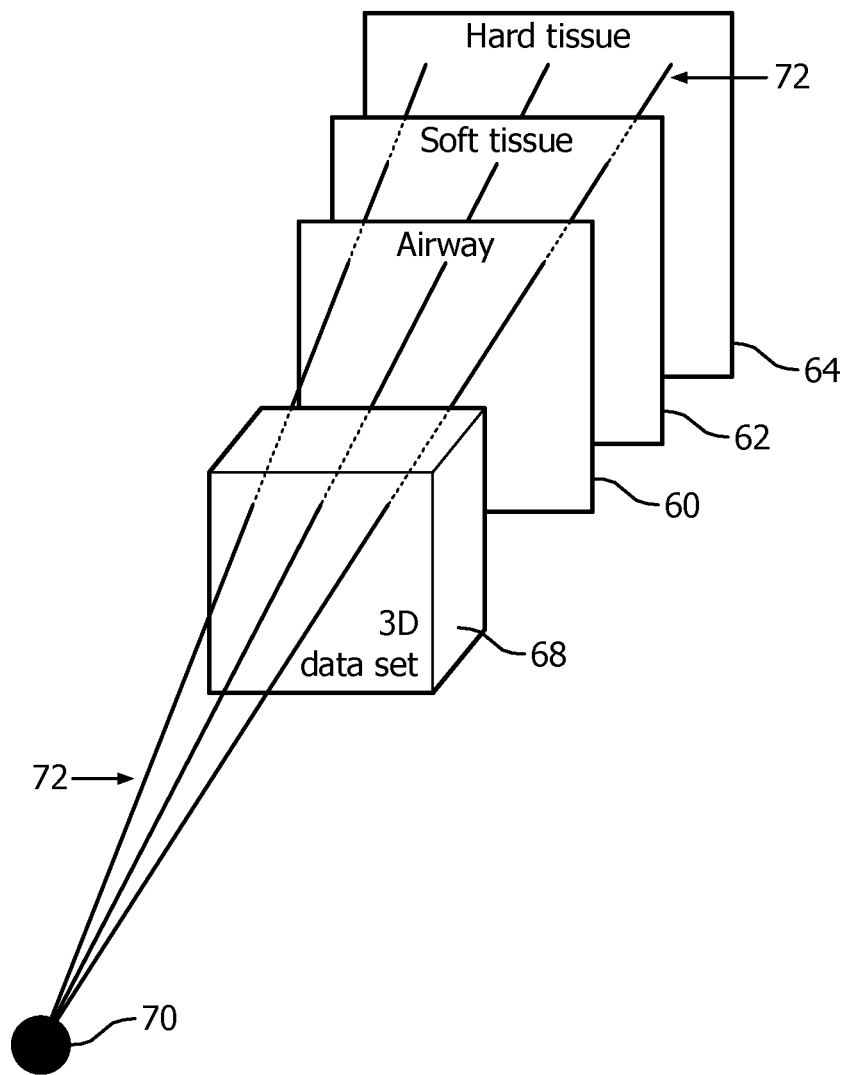
FIG. 5 is a diagrammatic illustration of ray-casting operations.

Returning to FIG. 2, values of voxels along a particular ray 72 are retrieved 106 via ray-casting operations, set forth in 106-116 and illustrated in FIGS. 3B and 5. The values of the voxels along the particular ray are compared 108 to those values specified in the value selection array 50 during ray-casting. In this case, each value selection is associated with one of the corresponding view windows 60, 62, and 64. The selection values can be specified ahead of time such that voxels along the particular ray 72 may contribute solely to only one of the projection data shown in view windows 60, 62, and 64, such that the voxel is then classified 110 as tissue contributing to the projection displayed in one of the view windows 60, 62, or 64. That is, each voxel may be selectively masked or zeroed relative to the projections in the two other view windows 60, 62, or 64 to which the voxel is not classified such as to allow all three projections to be mutually exclusive to each other. That is, the voxel value selection allows each voxel value to be used to compute the corresponding pixel value of only the projection image of the corresponding view window 60, 62, or 64.

The corresponding pixel values of all two-dimensional projection images shown in view windows 60, 62, and 64 are then concurrently generated 112 as the ray corresponding to the pixel is evaluated. Processed values of the voxels of the particular ray 72 are then selectively combined 114 to generate the values of the corresponding pixel in each of the two-dimensional projection image view windows 60, 62, and 64. That is, only voxels classified as within the range of values 50 for a specific view window 60, 62, or 64 will contribute to the determination of the value of the pixel in the view window 60, 62, or 64. This process is repeated for the ray corresponding to each pixel of the projection images or view windows 60, 62, 64 to build three projection images. This mutually exclusive voxel assignment is accomplished through the use of the value selection mechanism by creating three mutual specifications or value bins. It should be noted that the value specification need not be mutually exclusive and can have any desired pattern or logic as to produce the desired type of projection image.

FIG. 5 illustrates a ray-casting operation in accordance with one aspect described herein. Accordingly, FIG. 5 illustrates the generation of multiple images, i.e., planar projections from a three-dimensional data set for construction as a layered reconstructed radiograph. As shown in FIG. 5, a measured three-dimensional data set 68 is representative of the three-dimensional image data collected and reconstructed by the data acquisition module 42, i.e., a CT scan, an MR scan, a PET scan, etc. A virtual source 70 emits divergent, convergent, or parallel rays 72 through the three-dimensional data set 68. As the rays 72 exit the data set 68, three planar images (i.e., shown in view windows 60, 62, and 64) are concurrently generated. Each voxel along each ray 72 is processed to determine on which plane(s) its value should be utilized to generate the pixel value corresponding to the ray 72. Processing may include voxel integration along rays 72 using a function selected to transform three-dimensional voxel data so as to control the contributions of the voxels to the ray-casting sum, e.g., binary mask weighting of voxels of specific values or ranges of values, functions simulating radiation absorption or scattering, or the like. Although projecting from a source 70 through the three-dimensional image data set 68, alternatively a ray 72 can be projected from each predefined corresponding pixel of the projection images into the three-dimensional image set 68. By selecting parallel, convergent, or divergent, the scale of the three-dimensional image data set 68 can be maintained, magnified, or minimized.

Processing may include comparing the value of the voxel to a specified set of values that correspond to the specific view windows 60, 62, or 64 respectively, and then contributing their voxel only to the corresponding window and masking that voxel from appearing on the remaining two view windows 60, 62, or 64. The pixel value in a location on the planar projection image (the two-dimensional projection images shown in view windows 60, 62, or 64) may be calculated using a voxel selection function (g(r)) and a voxel processing function (h(r)) such that:

$$P(x, y) = \int_{ray} g(r) \cdot h(r) \, d^3 r$$

wherein P(x,y) is the pixel value in the projection image in view window 60, 62, or 64 at location (x,y). It will be appreciated that the value of the voxel is implicit at each location r within the object, i.e., the subject represented by the three-dimensional data set 68. Thus, one voxel processing function is expressed as a product of a selection (weighting) function and a processing (transform) function to give independent control of voxel selection and the transformation of selected voxels. Each unique voxel processing function can be used to generate unique projection planes (i.e., view windows 60, 62, and 64) from the same three-dimensional data set 68. According to one embodiment, each voxel along each ray (72) may be evaluated a number of times, the number corresponding to the number of predefined voxel type specifications and corresponding two-dimensional projection images to determine the value type corresponding to each voxel. In such an embodiment, each ray may be processed N times for N distinct defined planes such that each processing of a ray produces a combination of processed voxel values to form one pixel in the two-dimensional projection image corresponding to the value type specification. It will be appreciated that such processing allows for the production of multiple unique projection planes (i.e., as shown in view windows 60, 62, and 64) without requiring additional scans to be run to generate new/additional input three-dimensional image data.

As illustrated in FIG. 5, the resulting planar images, shown in view windows 60, 62, and 64 are capable of being generated concurrently based upon the voxels along each ray 72, each voxel contributing to the value of the pixel corresponding to the ray 72 on a single two-dimensional project image view window 60, 62, or 64. Thereafter, as discussed with respect to FIGS. 2-4, display and manipulation of the images in view windows 60, 62, and 64 may be performed.

FIG. 3B illustrates an embodiment 216 depicting an alternate ray-casting operation for creation of projection data, utilizing the output of FIG. 3A discussed above. Accordingly, a ray array is defined 218 that contains, i.e., holds, voxels collected along a ray. A mask array is defined 220 for results of voxel selection (e.g., performed in accordance with the voxel value selection (mask) function of 212), and a transform array is defined 222 for results of voxel processing (e.g., performed in accordance with the voxel value processing (transform) function of 214).

For a projection plane, the location of a next pixel in the projection array is determined 224 and a ray connecting the source 70 to the selected pixel (i.e., the location of the next pixel) in the projection array is defined 226. The mask array (i.e., the voxel selection array) corresponding to the projection plane is populated 228 using the corresponding voxel value selection (mask) function. The transform array is populated 230 by application of the voxel value processing (transform) function to each element of the mask array. Values of elements in the transform array are summed 232 and the sum is stored as the pixel value in the two-dimensional array (e.g., the two-dimensional array defined at 210). A determination 234 is then made whether another pixel in the projection array remains for processing, i.e., 226-232 are repeated for each pixel in the projection array. Upon a positive determination 234, operations return to 226. Upon a negative determination 234, a determination 236 is made whether another projection plane remains for processing, i.e., whether all projection planes defined at 206 have been addressed. Upon a negative determination, operations return to determining 224 the next pixel location in the projection array, as discussed above. Once all projection planes have been addressed, operations proceed to FIG. 3C, as discussed below.

Returning to FIG. 2 and with continued reference to FIGS. 4 and 5, a determination 116 is made whether any additional rays 72 remain for processing. Upon a positive determination, operations return to 106 for retrieval of voxels along that additional ray 72. Operations then continue from 108-116 as discussed above. When a determination 116 is made that no additional rays 72 remain for processing, a color scheme selection 118 is made for each two-dimensional projection image view window 60, 62, or 64. In one embodiment, the color scheme corresponds to selecting red for the airway view window 60, green for the soft tissue view window 62, and blue for the bone tissue view window 64. Other color schemes or combinations are also capable of being utilized herein, as well as other color spaces, e.g., CMYK, HSV, $YC_rC_b$, CIE l*a*b*, etc. For example, the assigned color scheme may correspond to a selected color space, such that each view window (60, 62, 64) is colorized using a separate channel of such selected color space. Each two-dimensional projection image view window 60, 62, and 64 is then colorized 120 in accordance with the selected color.

Respective pixels in each colorized two-dimensional image are then aligned 122 and layered 124 to form a layered reconstructed radiograph (LRR) 66. The LRR 66 is then displayed 126 via the display device 38, stored in storage memory 44, or both. An illustration of such an LRR 66 is displayed in FIG. 4, which details the layering of the colorized two-dimensional projection images in view windows 60, 62, and 64 to form the LRR 66. The display 126 of the LRR 66 via the display device 38 may include the graphical illustration of a variety of user selectable settings, icons, or indicia corresponding to image settings, options, and the like. That is, sliders, pull-down menus, fields, color tables/wheels, etc., may be displayed on the display device 38 which correspond to certain available manipulations of the LRR 66. For example, the available manipulations may include the ability to increase or decrease opacity or transparency of one or more of the layers (the projection image view windows 60, 62, 64) forming the LRR 66 to increase the prevalence of one layer over the others through alpha blending or other methods. Other examples may allow the user to manipulate the color intensity or luminosity levels of one or more of the layers, adjust the colors, remove a particular layer, replace one layer with another from those calculated, or the like. Furthermore, user manipulations may include the ability to designate different colors for different organs, e.g., red for heart, blue for lungs, green for liver, etc.

Receipt 128 of at least one aspect of at least one layered two-dimensional projection image view windows 60, 62, or 64, may be accomplished via the display device 38, e.g., a touch screen display, or via the user input device 40. The received manipulations are then applied 130 to the corresponding layered two-dimensional image or images. The LRR 66 displayed via the display device 38 is then dynamically updated 132 to reflect the LRR 66 in accordance with the applied user manipulations. Viewed another way, each LRR display pixel value corresponds to a mixture of corresponding pixel values in each of the projection images or view windows 60, 62, or 64. The manipulations control the relative weight, if any, which the corresponding projection images contribute to the corresponding LRR display pixel.

Figure 3C:
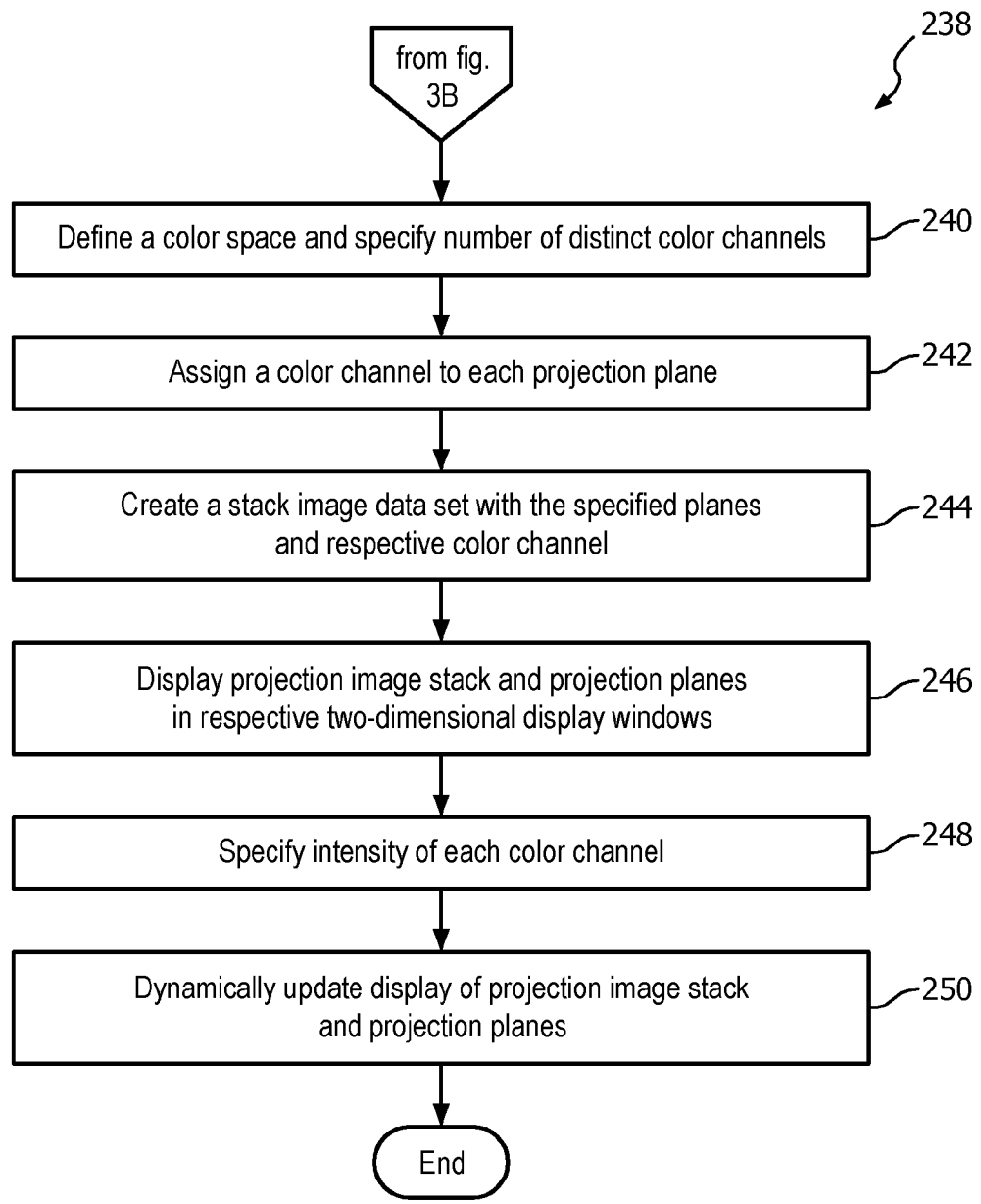

FIG. 3C provides an illustration of an alternate embodiment corresponding to 118-132 of FIG. 2, as discussed above. Accordingly, the flowchart 238 of FIG. 3C depicts the layering of the projection planes developed in accordance with the embodiment discussed above with respect to FIGS. 3A-3B. A color space is defined and a number of distinct color channels are specified 240. It will be appreciated that the color channels may be specified via any suitable color space selection, e.g., RGB, CMYK, HSV, $YC_rC_b$, CIE l*a*b*, etc. A color channel is assigned 242 to each projection plane, and a stack image data set, e.g., LRR 66, is created 244 with the specified planes and respective color channel assignment.

The LRR 66 is then displayed 246 in a two-dimensional display view window on the display device 38, along with each individual projection plane in its own dedicated display window, e.g., a computer screen having a plurality of windows open thereon, one window displaying the LRR 66 and each remaining window displaying one individual projection plane. The intensity of each color channel in the stack image display (i.e., LRR 66) is specified 248 from minimum (i.e., not visible/transparent) to maximum (i.e., full pixel saturation). The display of the projection image stack (i.e., LRR 66) is dynamically updated 250 in its display window, along with updates to the other display windows containing the projection planes in response to the intensity specification. Thus, for example, a user via the display device 38 may increase the intensity of one of the projection planes and reduce the intensity of the other planes, whereupon the LRR 66 is correspondingly updated to reflect that change in intensity, e.g., the blue of one plane becomes very saturated showing the structures, tissue types, organ(s), etc., associated therewith, while the remaining structures, tissue types, organ(s), etc., of the other planes associated with green and red become more or completely transparent in the projection image stack (LRR 66).

It will be appreciated that the subject systems and methods enable a user to utilize the generated layered two-dimensional projections to view any three-dimensional representation of an object using any modality as a specialized "transmission" radiograph. A patient is a special case of an object. By adjusting the voxel value selection (weighting) and voxel processing functions, one may come up with new "virtual" transmission imaging modalities that do not necessarily corresponded directly to measured images but none-the-less may be useful in the rapid analysis or visualization of three dimensional or higher data sets.

It will further be appreciated that the subject systems and methods described herein enable a variable tagging of CT number override of voxels within segmented CT data, thus allowing for the "soft-projection" of contoured structures. When a spatially variable override is based on a mathematical model, then the projection is set up to display in such a way to show probabilistic tumor boundaries that might be related to tumor cell density projections. These boundaries may be further refined using segmentation techniques such as manual contour adjustment, mesh fitting methods, or so forth. The layered images (or segmentation contours generated based on the layered images) may be used in various applications such as dose contouring for radiation therapy, attenuation correction of PET images, and so forth. Additionally, the systems and methods provide the ability to process higher dimension image data sets, for example four-dimensional CT image data sets can be viewed as a "stack" of layered reconstructed radiographs, one generated for each tagged three-dimensional image data set, enabling the tracking of a soft tissue target visually within the port of a static radiation field.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a controller includes: (1) a processor and a memory, the processor executing computer executable instructions on the memory embodying the functionality of the controller; or (2) analog and/or digital hardware; a user input device includes one or more of a mouse, a keyboard, a touch screen display, one or more buttons, one or more switches, one or more toggles, voice recognition engines, and the like; a database includes one or more memories; and a display device includes one or more of a CRT display, an LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A system for generating layered two-dimensional projections from a three-dimensional data set of an object, said system comprising:
   at least one processor programmed to:
      define a plurality of projection images, each view window corresponding to one of a set of predetermined voxel types, each voxel type including a voxel value selection specifying one or more ranges in value,
      classify each voxel along each of a plurality of rays through the data set as one of the predetermined voxel types in accordance with each voxel value with respect to the specified voxel value ranges, and,
      concurrently generating two-dimensional projection images populated by processed voxels belonging to each image's voxel value selection specification, and shown in view windows.

2. The system according to claim 1, wherein the voxel value selection specification can be set to non-overlapping ranges in voxel values corresponding to tissue types selected from the group consisting of air, soft tissue, and hard tissue.

3. The system according to claim 2, wherein the set of defined tissue types corresponds to at least one of a type of organ or a type of tumor.

4. The system according to claim 1, wherein concurrently generating the two-dimensional projection image corresponding to each of the view windows further includes selectively combining the processed value of each voxel of each ray to a pixel value of one of the two-dimensional projection images corresponding to the voxel value range specification in which each voxel is classified.

5. The system according to claim 4, wherein the processor is further programmed to determine the pixel value in a location on a two-dimensional projection image in accordance with a selection (weighting) function and a voxel processing function.

6. The system according to claim 1, wherein the processor is further programmed to:
   differently colorize each two-dimensional projection image for display in a view window in accordance with an assigned color scheme.

7. The system according to claim 6, wherein the assigned color scheme corresponds to a selected color space, and wherein each view window is colorized in accordance with a separate channel of the selected color space.

8. The system according to claim 1, wherein the processor is further programmed to:
   align pixels in each two-dimensional projection image view window with corresponding pixels in each other two-dimensional projection image view window; and,
   layer the plurality of two-dimensional projection image view windows to form a layered reconstructed radiograph in accordance with the aligned respective pixels.

9. The system according to claim 8, wherein the processor is further programmed to:
   receive user input corresponding to a manipulation of at least one aspect of at least one of the layered plurality of two-dimensional projection image view windows.

10. The system according to claim 9, wherein the at least one aspect is selected from the group including color, intensity, luminosity, transparency, and opacity.

11. The system according to claim 10, wherein the processor is further programmed to:
    dynamically update the layered reconstructed radiograph in accordance with the received user input.

12. The system according to claim 9, further including:
    a display device having a two-dimensional array of display pixels;
    a user input device; and,
    wherein the processor is further programmed to adjust a relative contribution of each two-dimensional projection image as shown in view windows based on user input on the user input device.

13. The system according to claim 1, further comprising an imaging scanner for generating the three-dimensional data set of a subject.

14. A method for generating layered two-dimensional image projections, said method comprising:
    defining a plurality of two-dimensional projection image data and associated view windows corresponding to one of a set of predetermined voxel types each having an associated voxel value selection;
    classifying each of a plurality of voxels along a plurality of rays cast through a three-dimensional data set as corresponding to one of the set of predetermined voxel types in accordance with a value of the voxel being within the associated voxel value selection;
    selectively adding a value of each voxel to a corresponding pixel value of one of the two-dimensional projection images shown in view windows of the plurality of thereof corresponding to the classified voxel type; and
    concurrently generating the plurality of two-dimensional projection image view windows in accordance with the selectively added values of each voxel to the corresponding pixel value of each two-dimensional projection image view window.

15. The method according to claim 14, selectively adding a value of each voxel to a corresponding pixel value further comprises:
    masking each voxel on each window having a voxel value outside the voxel value range corresponding to a voxel value specification assigned to that view window.

16. The method according to claim 14, further comprising:
    colorizing each two-dimensional projection image view window in accordance with an assigned color scheme, wherein each two-dimensional projection image view window corresponds to a different color.

17. The method according to claim 14, further comprising:
- aligning pixels in each two-dimensional projection image view window with respective pixels in each other two-dimensional projection image view window;
- layering the plurality of two-dimensional projection images respectively shown in view windows to form a layered reconstructed radiograph image in accordance with the aligned respective pixels; and,
- displaying the layered reconstructed radiograph image on an associated display device in its own dedicated view window.

18. The method according to claim 14, further including:
- receiving user input corresponding to a manipulation of at least one aspect of at least one of the layered plurality of two-dimensional projection image view windows; and
- dynamically updating the layered reconstructed radiograph view window in accordance with the received user input.

19. A non-transitory computer readable medium carrying software which controls one or more processors to perform the method according to claim 14.

20. A system comprising:
- a display device having a plurality of display pixels; and,
- at least one processor programmed to:
  - cast a ray corresponding to each display pixel through a three-dimensional (3D) image data set of a subject intersecting a plurality of voxels of the 3D image data set,
  - classify each the voxels of the 3D image data set intersected by each ray as being of zero or more voxel types, each voxel type corresponding to one of a plurality of predetermined voxel value ranges, the classifying including comparing each voxel value with the predetermined voxel value specifications, and
  - combine the processed voxel values along each ray that fall in the same value specification to generate pixel values of two-dimensional (2D) projection images, each 2D projection image corresponding to one of the value specifications such that each of the 2D projection images corresponds to one of the voxel value types.

21. A system according to claim 20, wherein the processor is further programmed to:
- colorize each 2D projection image in accordance with an assigned color scheme; and,
- adjust a relative contribution of each of the 2D projection layer images in accordance with user input to adjust a relative contribution of each voxel type in the displayed image.

22. A system according to claim 20, wherein the processor is further programmed to:
- sequentially evaluate each voxel along each ray for each 2D projection image to determine the value type corresponding to each voxel; and,
- process each ray N times for N distinct defined planes such that each processing of a ray produces a combination of processed voxel values to form one pixel in the 2D projection image corresponding to the value type specification.

* * * * *